(12) United States Patent
Barnard

(10) Patent No.: US 6,304,370 B1
(45) Date of Patent: Oct. 16, 2001

(54) TWO-STAGE MODULAR WIDE-BAND OPTICAL AMPLIFIERS

(75) Inventor: Chris W. Barnard, Sunnyvale, CA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/479,843

(22) Filed: Jan. 10, 2000

(30) Foreign Application Priority Data

Aug. 4, 1999 (CA) .................................................. 2279645

(51) Int. Cl.[7] ....................................................... H01S 3/00
(52) U.S. Cl. .......................................... 359/341.1; 359/349
(58) Field of Search ..................................... 359/341, 124, 359/349, 341.1

(56) References Cited

U.S. PATENT DOCUMENTS 6,049,418 * 4/2000 Srivastava et al. .................. 359/341
6,104,527 * 8/2000 Yang .................................... 359/341

* cited by examiner

*Primary Examiner*—Mark Hellner
(74) *Attorney, Agent, or Firm*—Foley & Lardner

(57) ABSTRACT

A modular architecture for a unidirectional fiber amplifier provides separate optical amplification for a short and long band transmission channels of a wide-band optical signal. The modular amplifier comprises a first gain stage that amplifies the short band and passes through the second-band, and a second gain stage connected in series with the first gain stage that amplifies the long band. The short band by-passes the second stage. The length of the doped fiber and the population inversion of active fiber of the first stage are selected to give an average inversion in excess of about 50%, while the length of the doped fiber and the population inversion of active fiber of the second stage are selected to give an average inversion in excess of about 50%.

18 Claims, 5 Drawing Sheets

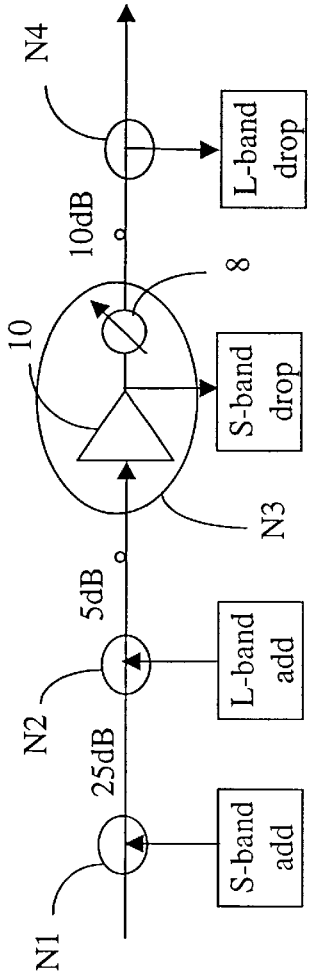
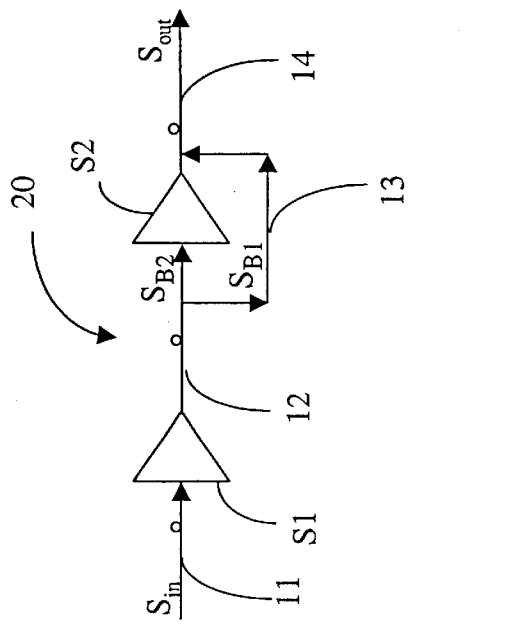
FIGURE 2
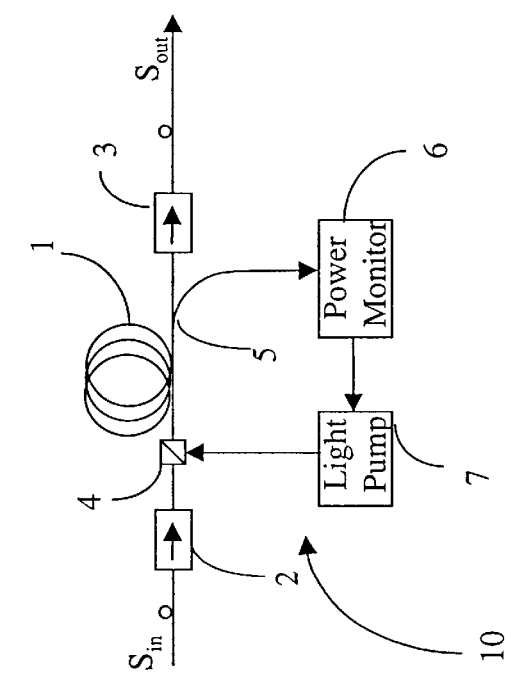
FIGURE 1A (Prior Art)
FIGURE 3A (Prior Art)

TWO-STAGE MODULAR WIDE-BAND OPTICAL AMPLIFIERS

BACKGROUND OF THE INVENTION

1. Field of the Invention

The invention is directed to optical amplifiers for wavelength division multiplexed (WDM/DWDM) optical networks, and in particular to a two stage modular fiber amplifier.

2. Background Art

The ITU has standardized wavelength-division multiplexed optical networks in which several optical channels are transmitted through a single optical fiber. Such networks can transport many signals, each transmitted over a separate carrier wavelength (channel), with each channel falling on one of the ITU grid frequencies. The ITU grid has frequencies spaced by 100 GHz, which corresponds to about 0.8 nm for wavelengths close to 1550 nm.

One of the advantages of WDM systems is that the optical component cost can be shared between all the transmitted channels. For example, current optical amplifiers, such as Erbium doped fiber amplifiers (EDFA) can simultaneously amplify a plurality of channels in the band from 1525 nm to 1610 nm.

Numerous problems are encountered in designing EDFAs for WDM networks. For example, the gain is not uniform across the WDM wavelength range of the EDFA. Therefore, the EDFAs exhibit a wavelength dependent gain, called gain tilt.

Gain tilt measures the change in the profile of the gain for each transmission channel at the actual value of the gain of the amplifier module with respect to the gain profile at the nominal value of the gain, i.e. at the value for which the amplifier is designed. For example, when the gain at 1550 nm is changed by 1 dB, the gain at 1530 nm changes by approximately 1.7 dB.

Gain tilt depends only on the physics of the dopant in the host fiber glass, and becomes a significant issue to consider in D/WDM networks. While no chemical solutions (dopants, fluoride, etc.) have yet been found for obtaining a flatt gain profile, electronic solutions are currently employed.

One known solution is to select the wavelengths for various channels amplified by the EDFA as a function of the gain variations of the different available pumps, so as to have similar gains for all channels. However, this solution becomes difficult when the number of channels is large.

Another solution is "gain clamping", which means maintaining the amplifier gain constant on all channels with an idler or lasing. However, this solution requires use of twice the number of laser pumps to provide the necessary extra photons.

Another solution is "loss padding", which implies tuning the loss of each span to match the nominal value for the amplifier or, in other words, to operate all amplifiers of the link at their nominal gain. Furthermore, this solution has the disadvantage of requiring variable optical attenuators (VOA) to be placed in each span, before or in the middle of the amplifier. This solution is not very robust in the presence of variations in losses and optical powers in the system over time and with temperature. Also, the system noise performance is limited to always be at the worst case. "Gain clamping" methods combined with "loss padding" slightly improve the robustness of the system, at the price of much more expensive pump lasers.

Another problem encountered in designing EDFAs for WDM networks is that, because the EDFA uses a single light source, the output power is shared among all channels, so that for N channels the output power/channel is roughly 1/N times the output for a single channel.

Still another problem in WDM networks is that stronger channels can saturate the EDFA gain, thereby limiting the gain of the weaker channels. This latter problem is of particular importance in ring, bus, and star networks, where channels propagate over widely varying distances. A solution to this problem is again to introduce VOAs in the stronger channels, which means additional equipment and power loss.

The prior art fails to provide cost effective solutions for amplification of bidirectional multi-channel optical signals.

SUMMARY OF THE INVENTION

It is an object of the present invention to provide a modular architecture for a fiber amplifier, which alleviates totally or in part the drawbacks of the prior art EDFAs.

According to one aspect of the invention, there is provided a modular unidirectional fiber amplifier for a wide-band optical signal transporting a plurality of first band transmission channels and a plurality of second band transmission channels, the modular fiber amplifier comprising, a first gain stage for receiving the wide-band optical signal and passing through the second-band transmission channels and providing a first-band amplified version of the first-band transmission channels, means for separating the first-band amplified version from the second-band transmission channels, a second gain stage connected in series with the first gain stage for receiving the second-band transmission channels and providing a second-band amplified version of the second-band transmission channels, means for combining the first-band amplified version and the second-band amplified version, and by-pass means, connected in parallel to the second gain stage, for routing the first-band amplified version from the means for separating to the means for combining.

In another embodiment of the invention there is provided a modular unidirectional fiber amplifier for a wide-band optical signal transporting a plurality of first band transmission channels and a plurality of second band transmission channels, the modular fiber amplifier comprising, a first gain stage for receiving the wide-band optical signal and passing through the second-band transmission channels to provide a first-band amplified version of the first-band transmission channels, an optical splitter/combiner for separating the first-band amplified version from the second-band transmission channels and for combining the first-band amplified version to a second-band amplified version, and a second gain stage for receiving the second-band transmission channels and providing the second-band amplified version of the second-band transmission channels.

In a further embodiment of the invention there is provided a modular unidirectional fiber amplifier for a wide-band optical signal transporting a plurality of first band transmission channels and a plurality of second band transmission channels, the modular fiber amplifier comprising, a first gain stage for receiving the wide-band optical signal and passing through the second-band transmission channels to provide a first-band amplified version of the first-band transmission channels, means for separating the first-band amplified version from the second-band transmission channels, a second gain stage for receiving the second-band transmission channels, and providing a second-band amplified version of the second-band transmission channels and for receiving the second-band amplified version and further amplifying same, means for reflecting the second-band amplified version towards the second gain stage for further amplification, and means for combining the first-band amplified version and the further amplified second-band amplified version.

A main advantage of the architecture according to the invention is that it provides optical amplification with a substantially flat gain over a wide bandwidth (BW>50 nm).

Another advantage of the architecture according to the invention is modularity. The gain region of a fiber amplifier is separated into a long-wavelength band stage and a short wavelength band stage in a modular fashion. In this way, the gain can be provided for either one or both bands, as required. Furthermore, the long and short wavelength band stages can be deployed separately or together, as required.

Still another advantage is that the cost of deploying EDFAs is significantly reduced in comparison to using a single wide-band region EDFA. It also reduces the requirements for attenuators to prevent EFDA saturation.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1A shows a current EDFA configuration;

FIG. 2 illustrates the principle of operation of the two-stage EDFA according to the invention;

FIG. 3A illustrates a segment of a typical WDM ring network with add/drop nodes equivalent to a WDM bus network;

DESCRIPTION OF THE PREFERRED EMBODIMENT

Figure 1B:
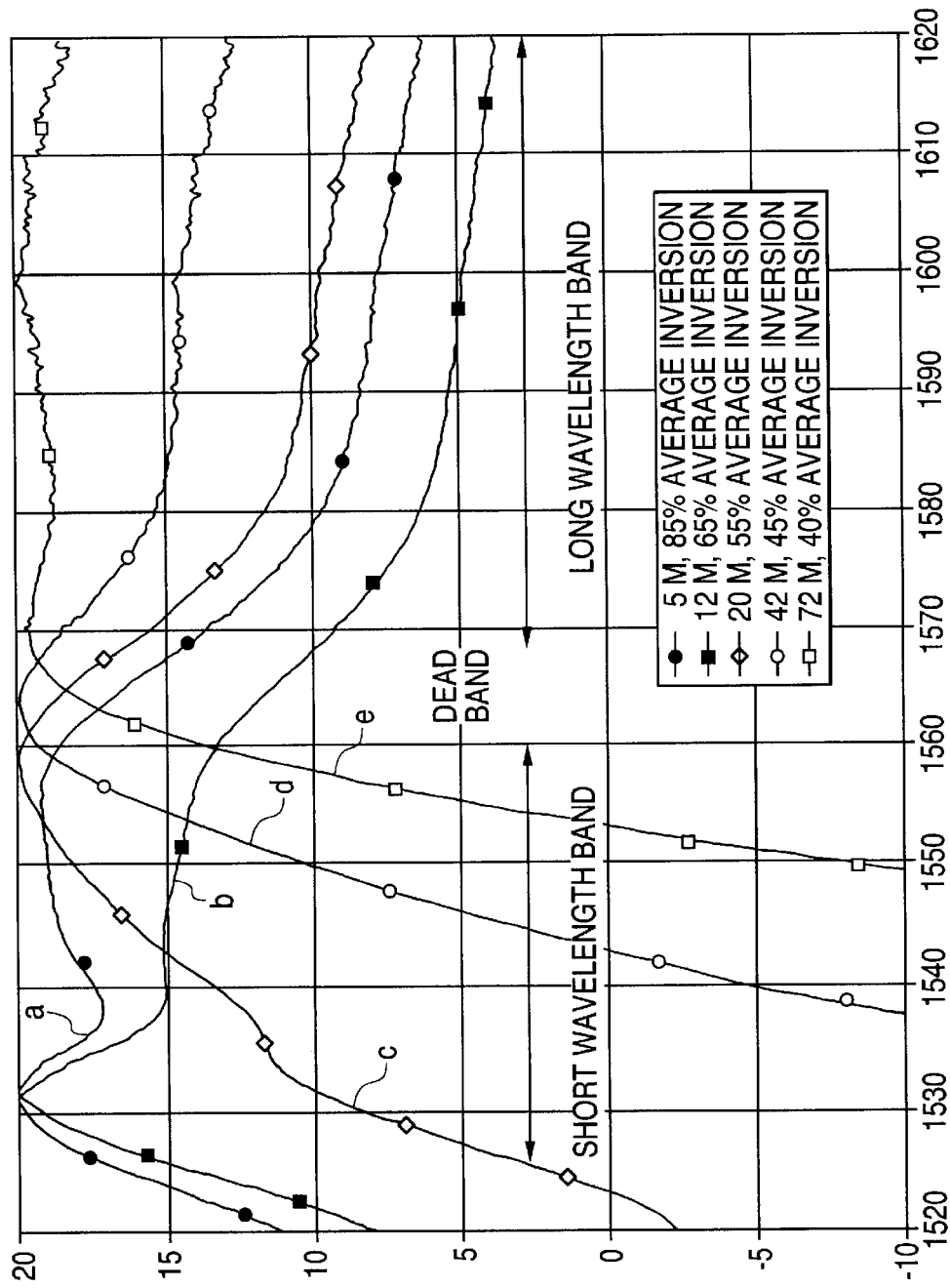
FIG. 1B illustrates a normalized gain spectra of various lengths of Erbium doped fibers.

A typical optical amplifier configuration 10 is shown in FIG. 1A. The optical amplifier comprises a length of active fiber 1, in this example an Erbium doped fiber amplifier EDFA. The optical amplifier 10 also includes optical isolators 2 and 3, and a light pump 7, which is a laser pump. The pump 7 transfers energy to the Erbium doped fiber and creates a population inversion in the fiber. The optical isolators 2 and 3 ensure that signals only propagate in one direction through the EDFA 1. At the output, a tap 5 is used for diverting a fraction of the output signal to a power monitor 6. A control loop is used to adjust the pump power to maintain a given output power level. The input and output optical signals are denoted with $S_{in}$ and $S_{out}$.

Assuming homogenous behaviour, the gain at a wavelength $\lambda$, expressed in dB, is given by:

$$G(\lambda)=4.34*[N_{2ave}*(\alpha(\lambda)+g(\lambda))-\alpha(\lambda)]*L \quad \text{EQ(1)}$$

where $N_{2ave}$ is the normalized population inversion averaged over the Erbium doped fiber length, g is the fiber gain coefficient in $m^{-1}$, $\alpha$ is the fiber absorption coefficient in $m^{-1}$, and L is the length of the doped fiber in m.

The gain spectrum of the EDFA can be adjusted by changing the length (L) of the doped fiber and the population inversion ($N_{2ave}$), as shown in FIG. 1B. FIG. 1B illustrates normalized gain spectra of various lengths of Erbium doped fibers, showing how the gain shifts to longer wavelengths as the length of the fiber increases and the population inversion decreases. For each amplifier length represented on FIG. 1B, the population inversion has been adjusted to normalize the maximum gain at 20 dB.

The maximum achievable population inversion is limited by the maximum available pump power. For a given pump power, the average population inversion decreases as the length increases. Therefore, the present invention proposes to design an optical amplifier with substantially flat gain by combining different lengths of fiber with different population inversions.

A short-wavelength band stage can be designed to have the gain spectrum for shorter wavelengths (1530–1560 nm) by selecting a pump wavelength, pump power, and fiber length that give average inversion in excess of about 50%. FIG. 1B shows the gain curve for three different EDFA's a, b and c, with a length of 5 m, 12 m and 20 m, and a respective average inversion of 85%, 65% and 55%. EDFA's a and b have a gain of 20 dB at a wavelength of 1533 nm and EDFA c has a gain of 20 db at 1558 nm.

A long-wavelength band EDFA stage can be designed to have the gain spectrum for longer wavelengths (1570–1610 nm) by selecting a pump wavelength, pump power, and fiber length that give average inversion less than about 50%. FIG. 1B also shows the gain curve for two different EDFA's d and e, with a length of 42 m and 72 m, and a respective average inversion of 45%, and 40%. EDFA's d and e have a gain of 20 dB at a wavelength of 1563 nm and respectively at 1570 nm.

It is to be noted on FIG. 1B, that for highly inverted fibers, such as is the case with EDFA's a, b and c, although the gain is maximum in the range of 1530–1560 nm, the wavelengths longer than 1570 nm still experience a gain of about 5 dB. Therefore, the short-wavelength band EDFA is approximately transparent for longer wavelengths.

However, the longer wavelength amplifiers with inversion less than about 50%, such as is the case with EDFA's d and e, strongly absorb the short wavelength light at 1530 nm with more than 15 dB absorption. Therefore, the long-wavelength band EDFA must have a bypass path for the short-wavelength light.

Having in view the above considerations, the present invention is directed to a modular optical design for achieving a wide band optical amplifier that has separate stages for short-wavelength frequencies (hereinafter also called B1 band) and long-wavelength frequencies (hereinafter also called B2 band). FIG. 2A shows a basic block diagram of an optical amplifier 20 comprised of an initial short-wavelength band gain stage S1, followed by a long-wavelength band gain stage S2. The optical signal Sin input to amplifier 20 over fiber 11 is amplified in stage S1, where, as discussed above, the short-wavelengths experience a maximum gain, while the longer wavelengths experience a small gain only. This small gain compensates for the insertion losses of stage S1, so that the short-wavelength band gain stage is practically transparent to long wavelengths.

After amplification in stage S1, the signal on fiber 12 is separated into $S_{B1}$ including the channels in the short-wavelength band B1, and $S_{B2}$, including the channels in the long wavelength band B2. The second stage S2 receives $S_{B2}$, $S_{B1}$ passing through an alternative route 13. This is for avoiding absorption of the short wavelengths, as discussed above in connection with FIG. 1B.

At the output of the second stage S2, the signals are re-combined, so that the signal $S_{out}$ at the output of amplifier 20, i.e. the signal on the output fiber 14, comprises the entire spectrum of the input signal, all wavelengths having a substantially similar gain.

These two stages can be packaged in separate modules or as one complete module. An advantage of packaging the two gain stages in separate modules is that some networks, such as D/WDM rings, may only need amplification in the short or long wavelength bands. In such a case, having the option of providing gain for one band only can significantly reduce the cost of the network. Furthermore, if a wide band amplifier covering both bands is installed in applications where only one band needs to be amplified, the channels that do not need to be amplified may have to be attenuated to prevent them from saturating the amplifier.

In other cases, where both the long and short wavelength bands must be amplified, the two gain stages can be packaged in one module. Separating the two gain stages still gives the advantage of having separate control for the short and long bands so that they can be independently optimized.

Figure 3B:
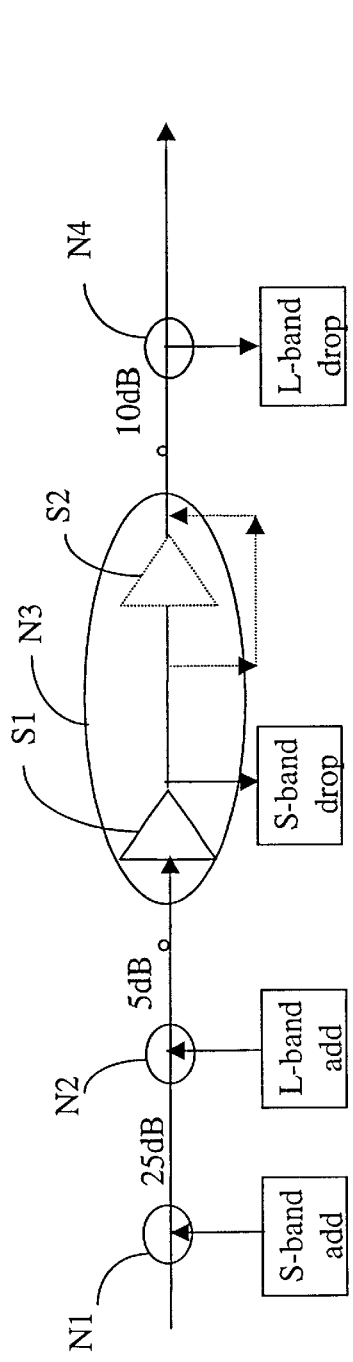
FIG. 3B illustrates the WDM ring network of FIG. 3A with the modular amplifier according to the invention.

FIGS. 3A and 3B give one example of how the modular EDFA 20 can be used to replace a conventional optical amplifier 10 in a ring D/WDM network. A ring D/WDM network is one example of a network where different spectral bands, which are added and dropped at different nodes in the ring, propagate through different distances. As such, different channels/bands have quite different amplification requirements. Nonetheless, the modular amplifier described herein also has applications in other type of D/WDM networks, such as linear or star networks, where different spectral bands are transmitted over different distances.

FIG. 3A illustrates a segment of a D/WDM ring network with add nodes N1 and N2, and drop nodes N3 and N4. In this example the short-wavelength band has a total link loss of 30 dB form the add node N1 to drop node N3, and the long-wavelength band has a total link loss of 15 dB form the add node N2 to drop node N4. In this example, the link budget is 25 dB, so that an optical amplifier 10 is needed between N1 and N3.

Location of the EDFA 10 must be selected to provide adequate received powers and signal-to-noise ratios for the short-wavelength band. In this example EDFA 10 is installed at node N3, where the band B2 is dropped. On the other hand, amplification is not necessary for the long-wavelength band, since as indicated above, the link budget is 25 dB. The input power to the EDFA 10 from the long-wavelength band is approximately 20 dB greater than the input power from the short-wavelength band. If the EDFA were gain-flattened over the whole spectrum, then the long-wavelength band, with its higher input power, would saturate the amplifier, thereby limiting the gain in the short-wavelength band.

The most popular way of solving this saturation problem today is to attenuate the launched power in the long wavelength band. This solution however implies using an attenuator 8 at the output of the amplifier 10.

The modular amplifier according to the invention provides an alternative solution to the saturation problem, which is shown in FIG. 3B. Here, only first stage S1 of modular amplifier 20 is used, which is not saturated by the higher input power from the long wavelength band, for the reasons discussed above. If the last span of 10 dB between N3 and N4 were longer so that amplification were required in the long band before node N4, then the second stage S2 of the modular EDFA could also be installed. This is shown in dotted lines on FIG. 3B.

Since a short or a long wavelength EDFA cost less than a single wide-band amplifier, the modular EDFA provides a lower cost solution for the application shown in FIG. 3B than a wide band EDFA with an attenuator for the long wavelength band shown in FIG. 3A. Providing separate gain stages also reduces saturation of the amplifier by the short or long band in an add/drop network.

Figure 4A:
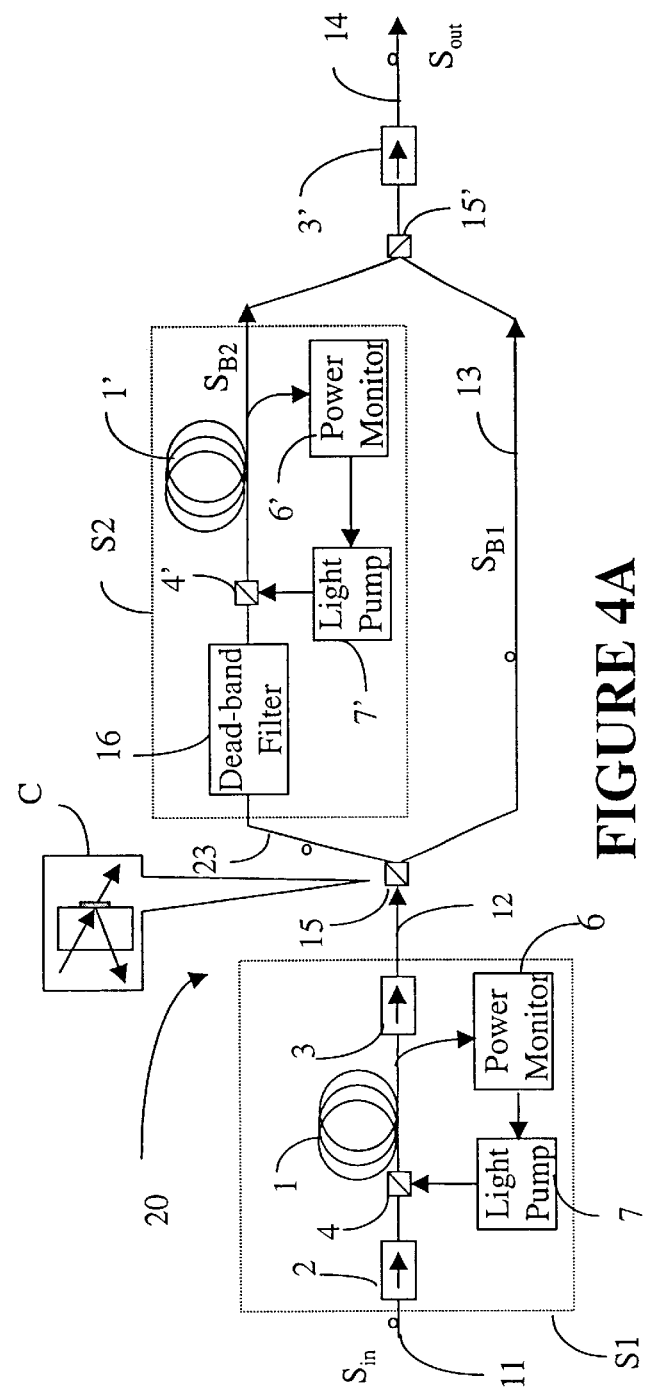
FIG. 4A is an embodiment of the two stage EDFA.

FIG. 4A shows the modular optical amplifier 20 in further details. As discussed above, long-wavelength and short wavelength bands are separately amplified in such a manner that, depending on the network requirements, one or both of the modules are used to obtain wide-band amplification. The conventional short-wavelength stage S1 comprises a selected length of Erbium doped fiber 1 separated form the input and output port by isolators 2 and 3, a light pump 7, and the respective WDM coupler 4 for inserting the light from the pump into the doped fiber. The light pump 7 of stage S1 preferably operates at 980 nm.

At the input of the second stage S2, a three-port optical filter 15 separates the short and long wavelength light so that the long-wavelength signal $S_{B2}$ is amplified in the upper arm 23 of stage S2, while signal $S_{B1}$ passes through the lower arm 13. The two signals are added by combiner 15' and transmitted over output fiber 14.

Figure 4B:
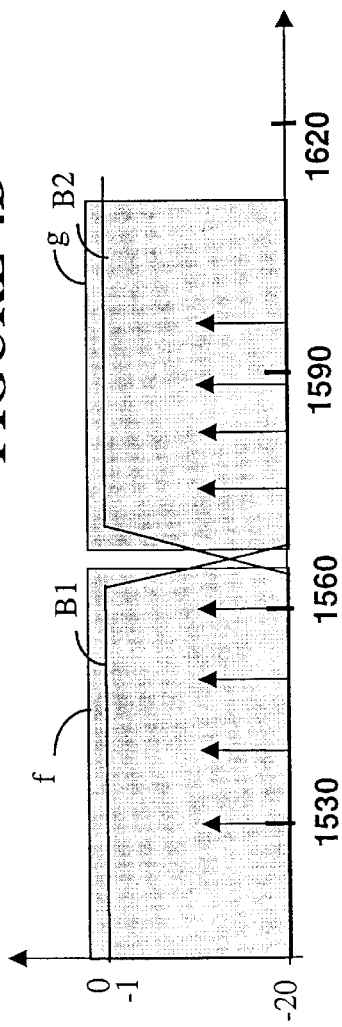
FIG. 4B shows the spectra of a three-port optical band-splitting filters and a dead-band filter.

The optical band-splitting filter 15 can be of a type as shown in the insert C. FIG. 4B illustrates the short-wavelength transmission band as graph B1, and the long-wavelength transmission band, as graph B2. The spectrum of the three-port optical band splitter 15 is shown by graph f, which shows that the filter transmits the long-wavelength band and reflects the short-wavelengths. If the isolation of the three-port filter 15 is not adequate, one or more dead-band filters 16 can be inserted to prevent short-wavelength light from passing through path 23. The spectrum of the dead-band filter 16 is shown by graph g.

The band splitting filter 15 and dead-band filter 16 must be designed to prevent multi-pass interference, a degradation that occurs when a signal interfaces with versions of itself, due to different delays experienced while traversing multiple paths towards the respective receiver.

The second stage is provided with second gain stage 1', with the respective light pump 7', coupled to the EDFA by a coupler 4'. The light pump 7' of stage S2 preferably operates at 1480 nm. Isolator 3' is provided for the similar reasons as disclosed in connection with FIG. 1A.

Stages S1 and S2 may be equipped with separate power monitors 6 and 6'. This separation of the monitoring function enhances flexibility of the architecture, in that it allows per-band monitoring.

The lengths and inversion levels of the Erbium doped fibers 1 and 1' are chosen as in FIG. 1B to optimize the gain in the respective spectral bands. One or more gain-flattening filters could be inserted in either of the gain stages to further optimize the gain of each section independently. Since the two gain stages are physically separated, being connected only by optical fiber 12, they may be packaged separately and even be deployed at different points in a WDM network, as needed.

Figure 5:
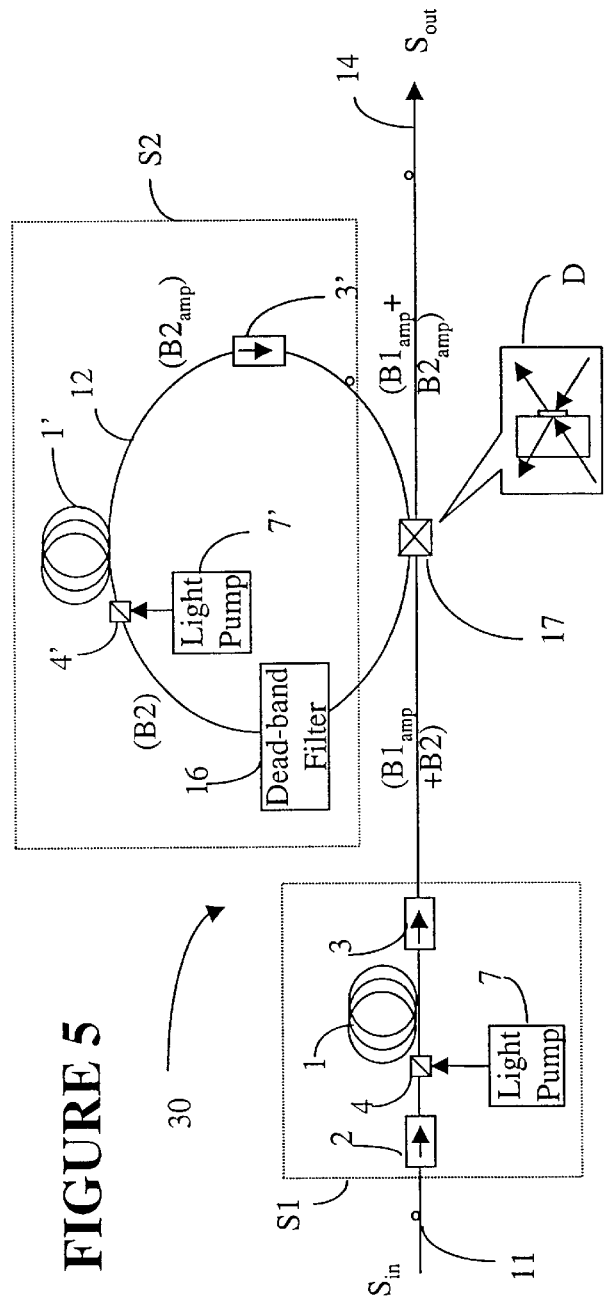
FIG. 5 illustrates another embodiment of the two stage EDFA.

FIG. 5 shows a second embodiment of the two-stage optical amplifier. The first stage S1 is similar to that of FIG. 4A. The second stage uses a four-port filter 17 to split the short and long wavelength bands. The four-port filter 17, shown in detail in insert D, directs light in the band B2 along fiber 12 through the second stage 1', while the light in band B1 is transmitted to the output without further amplification.

B2 band is amplified separately by EDFA 1', and recombined at the output, so that the output signal includes the amplified channels in both bands. Again, S2 is provided with the respective pump 7' coupler 4', and isolator 3', and optionally, with a dead-band filter 16.

Figure 6:
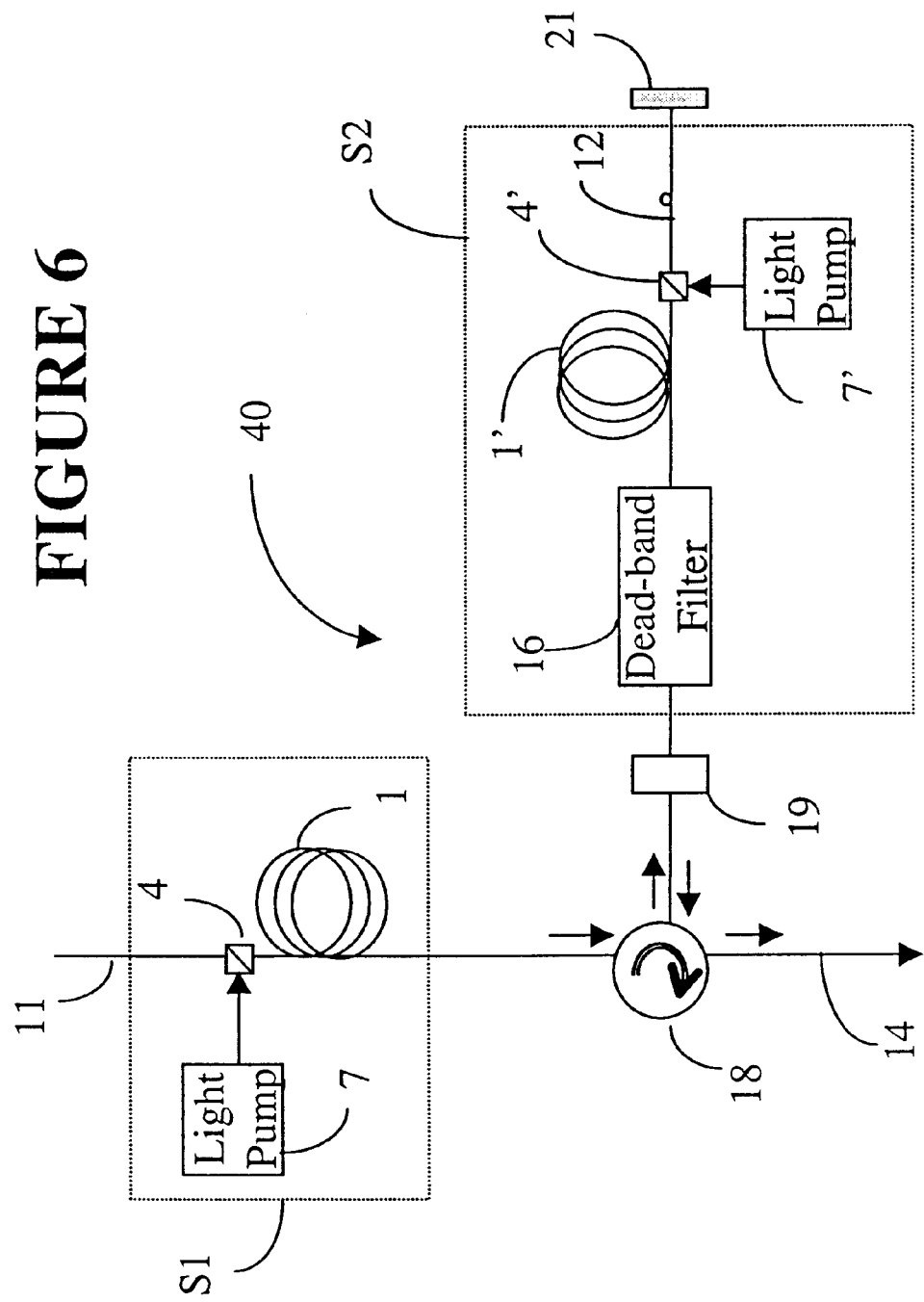
FIG. 6 shows still another embodiment of the two stage EDFA.

FIG. 6 shows another embodiment of the modular amplifier, where the second stage S2 is arranged in a reflective configuration with an optical circulator 18. The first gain stage S1 is similar to that of the previous embodiments. The optical circulator 18 guides light from the input port to a reflective filter 19, which reflects B1 band back towards the circulator 18. Filter 19 may be for example of the dielectric type.

The signal passes through the EDFA 1', where the channels in B2 band are amplified a first time. The amplified signal is reflected back to EDFA 1' by a mirror 21, and amplified for a second time. This reflective configuration has the advantage that it increases the signal gain in the B2 band. Flat gain over a large spectrum can be achieved by properly designing the reflection and transmission spectra of the filter 19 and the lengths of each gain section 1 and 1'.

As in the other embodiments, the two gain sections 1 and 1' can be independently optimized and deployed in one or two separate modules.

I claim:

1. A modular unidirectional fiber amplifier for a wide-band optical signal transporting a plurality of first band transmission channels and a plurality of second band transmission channels, said modular fiber amplifier comprising:
   a first gain stage for receiving said wide-band optical signal and passing through said second-band transmission channels and providing a first-band amplified version of said first-band transmission channels;
   means for separating said first-band amplified version from said second-band transmission channels;
   a second gain stage connected in series with said first gain stage for receiving said second-band transmission channels and providing a second-band amplified version of said second-band transmission channels;
   means for combining said first-band amplified version and said second-band amplified version; and
   by-pass means, connected in parallel to said second gain stage, for routing said first-band amplified version from said means for separating to said means for combining.

2. A modular unidirectional fiber amplifier as claimed in claim 1, wherein said first-band channels are in a transmission band between 1530–1560 nm, and said second-band channels are in a transmission band between 1570–1610 nm.

3. A modular unidirectional fiber amplifier for a wide-band optical signal transporting a plurality of first band transmission channels and a plurality of second band transmission channels, said modular fiber amplifier comprising:
   a first gain stage for receiving said wide-band optical signal and passing through said second-band transmission channels and providing a first-band amplified version of said first-band transmission channels;
   means for separating said first-band amplified version from said second-band transmission channels;
   a second gain stage connected in series with said first gain stage for receiving said second-band transmission channels and providing a second-band amplified version of said second-band transmission channels;
   means for combining said first-band amplified version and said second-band amplified version; and
   by-pass means, connected in parallel to said second gain stage, for routing said first-band amplified version from said means for separating to said means for combining, wherein said first gain stage has a first length of active fiber with an average inversion in excess of about 50% for amplifying said first-band channels with a preset gain, and for passing through substantially transparently said second-band channels.

4. A modular unidirectional fiber amplifier as claimed in claim 3, wherein said second gain stage has a second length of active fiber with an average inversion less than about 50% for amplifying said second-band channels with said preset gain.

5. A modular unidirectional fiber amplifier as claimed in claim 4, wherein said first length is shorter than said second length.

6. A modular unidirectional fiber amplifier as claimed in claim 3, wherein said first gain stage further comprises input and output isolators for disallowing light to travel in a direction contrary to the direction of said first and second-band channels.

7. A modular unidirectional fiber amplifier as claimed in claim 4, wherein said second stage comprises a dead-band filter for impeding said first-band channels from passing through said second gain stage.

8. A modular unidirectional fiber amplifier as claimed in claim 1, further comprising separate output power monitoring means for said first-band and second-band gain stages.

9. A modular unidirectional fiber amplifier as claimed in claim 1, wherein said means for separating comprises an optical band-splitting filter.

10. A modular unidirectional fiber amplifier as claimed in claim 1, wherein said means for combining comprises an optical band-combining filter.

11. A modular unidirectional fiber amplifier as claimed in claim 1, wherein said by-pass means comprises a fiber path connected between said means for separating and said means for combining.

12. A modular unidirectional fiber amplifier for a wide-band optical signal transporting a plurality of first band transmission channels and a plurality of second band transmission channels, said modular fiber amplifier comprising:
   a first gain stage for receiving said wide-band optical signal and passing through said second-band transmission channels to provide a first-band amplified version of said first-band transmission channels;
   an optical splitter/combiner for separating said first-band amplified version from said second-band transmission channels and for combining said first-band amplified version to a second-band amplified version; and
   a second gain stage for receiving said second-band transmission channels and providing said second-band amplified version of said second-band transmission channels.

13. A modular unidirectional fiber amplifier as claimed in claim 12, wherein said optical splitter/combiner is a four-port filter.

14. A modular unidirectional fiber amplifier for a wide-band optical signal transporting a plurality of first band transmission channels and a plurality of second band transmission channels, said modular fiber amplifier comprising:
   a first gain stage for receiving said wide-band optical signal and passing through said second-band transmission channels to provide a first-band amplified version of said first-band transmission channels;
   an optical splitter/combiner for separating said first-band amplified version from said second-band transmission channels and for combining said first-band amplified version to a second-band amplified version; and a second gain stage for receiving said second-band transmission channels and providing said second-band amplified version of said second-band transmission channels, wherein said optical splitter/combiner is a four-port filter, wherein said four port filter comprises:
   a first port connected to the output of said first gain stage for receiving said first-band amplified version and said second-band transmission channels,
   a second port connected to the input of said second stage to provide said second-band channels;
   a third port connected to the output of said second gain stage to receive said second-band amplified variant; and
   a fourth port for providing said first-band and second-band amplified variants.

15. A modular unidirectional fiber amplifier for a wide-band optical signal transporting a plurality of first band transmission channels and a plurality of second band transmission channels, said modular fiber amplifier comprising:
   a first gain stage for receiving said wide-band optical signal and passing through said second-band transmission channels to provide a first-band amplified version of said first-band transmission channels;
   means for separating said first-band amplified version from said second-band transmission channels;
   a second gain stage for receiving said second-band transmission channels, and providing a second-band amplified version of said second-band transmission channels and for receiving said second-band amplified version and further amplifying same;
   means for reflecting said second-band amplified version towards said second gain stage for further amplification; and
   means for combining said first-band amplified version and said further amplified second-band amplified version.

16. A modular unidirectional fiber amplifier as claimed in claim 15, wherein said means for separating is a reflective filter connected at the input of said second gain stage.

17. A modular unidirectional fiber amplifier for a wide-band optical signal transporting a plurality of first band transmission channels and a plurality of second band transmission channels, said modular fiber amplifier comprising:
   a first gain stage for receiving said wide-band optical signal and passing through said second-band transmission channels to provide a first-band amplified version of said first-band transmission channels;
   means for separating said first-band amplified version from said second-band transmission channels;
   a second gain stage for receiving said second-band transmission channels, and providing a second-band amplified version of said second-band transmission channels and for receiving said second-band amplified version and further amplifying same;
   means for reflecting said second-band amplified version towards said second gain stage for further amplification; and
   means for combining said first-band amplified version and said further amplified second-band amplified version, wherein said means for separating is a reflective filter connected at the input of said second gain stage, wherein said means for combining comprises a three-port circulator connected between said first gain stage and said reflective filter and the output port of said fiber amplifier.

18. A modular unidirectional fiber amplifier as claimed in claim 15 wherein said means for reflecting is a mirror.

* * * * *